United States Patent
Tali et al.

(10) Patent No.: US 11,695,741 B2
(45) Date of Patent: Jul. 4, 2023

(54) BLOCKCHAIN NETWORK INCORPORATING AN INDIVIDUAL'S GEO-LOCATION VIA A COMMUNICATION NETWORK AND APPLICATIONS USING THE SAME

(71) Applicant: TALIWARE, INC., San Diego, CA (US)

(72) Inventors: Tarik Tali, San Diego, CA (US); Hassan Zili, Tangier (MA); Abdelhak Tali, Tangier (MA)

(73) Assignee: TALIWARE, INC., San Diego, CA (US)

( * ) Notice: Subject to any disclaimer, the term of this patent is extended or adjusted under 35 U.S.C. 154(b) by 53 days.

(21) Appl. No.: 16/886,736

(22) Filed: May 28, 2020

(65) Prior Publication Data
US 2020/0329018 A1    Oct. 15, 2020

Related U.S. Application Data

(63) Continuation of application No. PCT/US2018/066754, filed on Dec. 20, 2018.
(Continued)

(51) Int. Cl.
*H04L 9/40*    (2022.01)
*H04L 9/32*    (2006.01)
(Continued)

(52) U.S. Cl.
CPC ............ *H04L 63/0428* (2013.01); *H04L 9/32* (2013.01); *H04L 63/0861* (2013.01); *H04W 12/30* (2021.01); *H04W 12/63* (2021.01)

(58) Field of Classification Search
CPC .... H04L 63/0428; H04L 63/0861; H04L 9/32
(Continued)

(56) References Cited

U.S. PATENT DOCUMENTS 9,342,677 B2 *  5/2016  Ali .................... H04W 12/06
9,715,584 B2 *  7/2017  Han .................... G06F 21/32
(Continued)

FOREIGN PATENT DOCUMENTS

WO    2017/007806     1/2017
WO    2017/1171733    10/2017
(Continued)

*Primary Examiner* — Dant B Shaifer Harriman
(74) *Attorney, Agent, or Firm* — Blynn L. Shideler; Krisanne Shideler; BLK Law Group

(57) ABSTRACT

A blockchain network management system implements an associated method comprising the steps of: a) providing a blockchain network configured for providing individual blockchain users with access to a blockchain; b) providing individual blockchain users with a smartphone having a GPS receiving unit associated with a communications network and with a biometric user identification technology coupled to the smartphone; c) identifying an individual blockchain user with the biometric user identification technology by obtaining biometric characteristics that are unique to each human via the communications network; d) authenticating the individual blockchain user's identity and geolocation in an authentication network coupled to the communications network; and e) providing access of authenticated individual blockchain users to the individual blockchain. The blockchain network management system further includes tokens issued to individual authenticated users for providing access to the individual blockchain.

19 Claims, 6 Drawing Sheets

Related U.S. Application Data

(60) Provisional application No. 62/608,716, filed on Dec. 21, 2017.

(51) Int. Cl.
*H04W 12/30* (2021.01)
*H04W 12/63* (2021.01)

(58) Field of Classification Search
USPC .......................................................... 713/168
See application file for complete search history.

(56) References Cited

U.S. PATENT DOCUMENTS

| | | | | |
|---|---|---|---|---|
| 10,817,593 | B1* | 10/2020 | Andra | G06F 21/6245 |
| 2018/0233000 | A1* | 8/2018 | Lee | G06Q 20/108 |
| 2018/0343120 | A1* | 11/2018 | Andrade | H04L 9/0637 |
| 2020/0005295 | A1* | 1/2020 | Murphy | G06Q 20/405 |
| 2020/0342548 | A1* | 10/2020 | Mazed | G06Q 20/321 |
| 2020/0366671 | A1* | 11/2020 | Larson | H04W 12/06 |
| 2021/0089637 | A1* | 3/2021 | Cummins | H04W 12/68 |
| 2022/0270426 | A1* | 8/2022 | Seenivasagam | H04L 63/107 |

FOREIGN PATENT DOCUMENTS

| | | |
|---|---|---|
| WO | 2017213943 | 12/2017 |
| WO | 2019/126471 | 6/2019 |

* cited by examiner

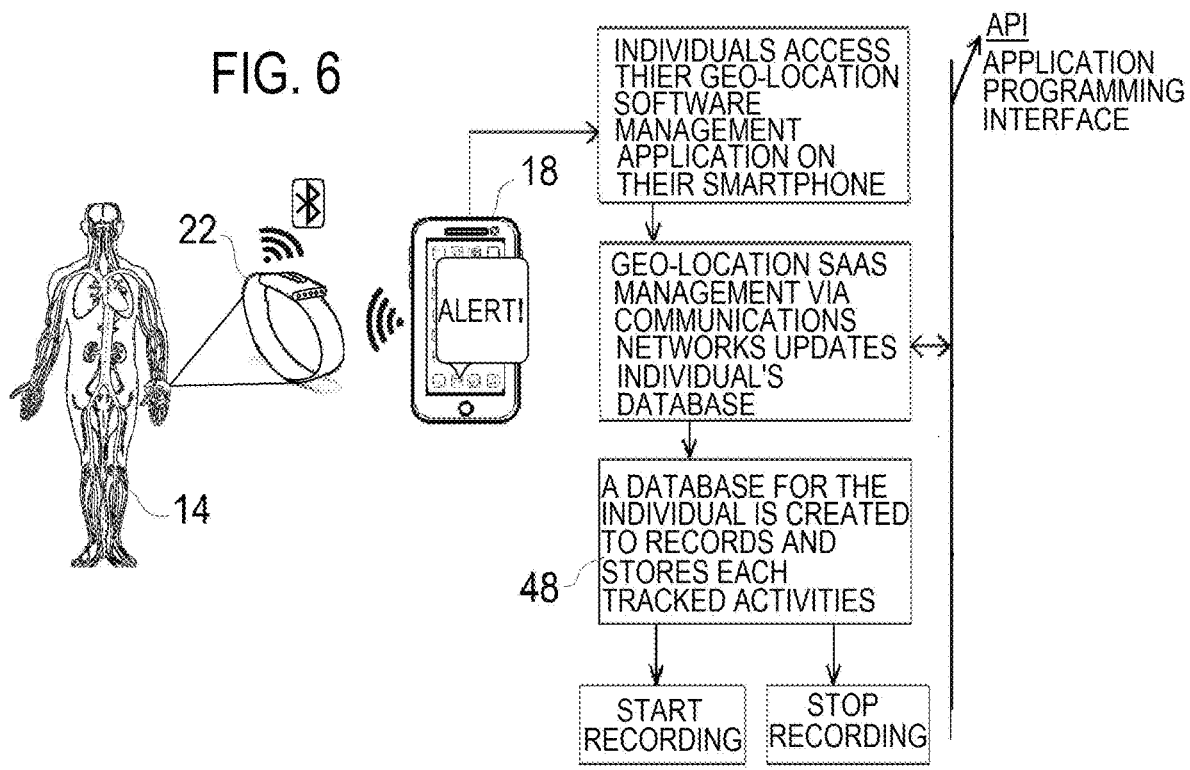

BLOCKCHAIN NETWORK INCORPORATING AN INDIVIDUAL'S GEO-LOCATION VIA A COMMUNICATION NETWORK AND APPLICATIONS USING THE SAME

RELATED APPLICATIONS

The present application is a continuation of International Application No. PCT/US2018/066754 filed Dec. 20, 2018 and which published Jun. 27, 2019 as Publication WO/2019-126471, which publication is incorporated herein by reference. International Application No. PCT/US2018/066754 claims priority of U.S. Provisional Application Ser. No. 62/608,716.

BACKGROUND OF THE INVENTION

1. Field of the Invention

The present invention relates to blockchain biometric authenticating geo-locations software management utility. Specifically, the present invention provides a method and system for a blockchain network management which incorporates biometric based authentication of an individual via a geolocation obtaining communication network and applications using the same.

2. Background Information

Blockchain Background

A blockchain, originally block chain, is a continuously growing list of records, called blocks, which are linked and secured using cryptography. Each block typically contains a hash pointer as a link to a previous block, timestamp and transaction data. Blockchains are inherently resistant to modification of the data. The Harvard Business Review describes a blockchain as "an open, distributed ledger" that can record transactions between two parties efficiently and in a verifiable and permanent way." For use as a distributed ledger, a blockchain is typically managed by a peer to peer network collectively adhering to a protocol for validating new blocks. Once recorded, the data in any given block cannot be altered retroactively without the alteration of all subsequent blocks, which requires collusion of the network majority.

A blockchain facilitates secure online transactions. A blockchain is a decentralized and distributed digital ledger that is used to record transactions across many computers so that the record cannot be altered retroactively without the alteration of all subsequent blocks and the collusion of the network. This generally allows the participants to verify and audit transactions inexpensively. They are sometimes described as being authenticated by mass collaboration powered by collective self-interests with the result allegedly being a robust workflow where participants' uncertainty regarding data security is marginal. The use of a blockchain removes the characteristic of infinite reproducibility from a digital asset. It confirms that each unit of value was transferred only once, solving the long-standing problem of double spending. Blockchains have been described as a value-exchange protocol. A blockchain can assign title rights because it provides a record that compels offer and acceptance. A blockchain database consists of two kinds of records: transactions and blocks. Blocks hold batches of valid transactions that are hashed and encoded into a Merkle tree. Each block includes the hash of the prior block in the blockchain, linking the two. The linked blocks form a chain. This iterative process confirms the integrity of the previous block, all the way back to the original genesis block.

Sometimes separate blocks can be produced concurrently, creating a temporary fork. In addition to a secure hash-based history, any blockchain system has a specified algorithm for scoring different versions of the history so that one with a higher value can be selected over others. Blocks not selected for inclusion in the chain are called orphan blocks. Peers supporting the database have different versions of the history from time to time. They only keep the highest scoring version of the database known to them. Whenever a peer receives a higher scoring version (usually the old version with a single new block added) they extend or overwrite their own database and retransmit the improvement to their peers.

Major applications of blockchain include cryptocurrencies, such as BITCOIN, and blockchain platforms such as FACTOM as a distributed registry, GEMS for decentralized messaging, STORJ and SIA for distributed cloud storage, and TEZOS for decentralized voting. New blockchain based distribution methods are available for the insurance industry such as peer-to-peer insurance, parametric insurance and micro-insurance following the adoption of blockchain. Banks are interested in blockchain technology because it has potential to speed up "back office" settlement systems. The sharing economy and IoT (Internet of Things) are also set to benefit from blockchains because they involve many collaborating peers. Online voting is another application of blockchain technology. Blockchains are being used to develop information systems for medical records, which increases interoperability. In theory, legacy disparate systems can be completely replaced by blockchains. Blockchains are being developed for data storage, publishing texts and identifying the origin of digital art.

Smartphone GPS Background

The term smartphone (or smartphone) is a mobile phone with an advanced mobile operating system which typically combines the features of a cell phone with those of other popular mobile devices, such as personal digital assistant (PDA), media players and GPS navigation units. Most smartphones have a touch screen user interface and can ran third-party applications (apps), and are camera phones and audio recorders. Generally, since at least 2012, smartphones have high-speed mobile broadband 4G LTE internet web browsing, motion sensors, and mobile payment mechanisms. In 2014, sales of smartphones worldwide topped 1.2 billion, which is almost a 30% increase from sales of 2013.

GPS, or global positioning satellite, is a satellite-based navigation system used to give exact location and time information anywhere on Earth. The system is maintained by the U.S. government and is accessible, free of charge, to anyone with a GPS receiver. Consumers have become increasingly reliant on GPS receivers for navigation while driving, as well as while biking and walking.

Originally, standalone GPS units, also known as personal navigation devices, were the only option available to consumers who wanted to take advantage of GPS technology. However, now that almost every current smartphone comes with a built-in GPS receiver, smartphones have largely replaced standalone units as consumers generally have found it is more convenient to just use their phones as navigation tools rather than bother with a separate standalone GPS unit. The smartphone GPS navigation apps are a subset of what can be considered broader geo-locations data management systems.

Smartphone GPS navigation apps gets frequent, automatic updates, meaning all the latest maps will always be on-hand and having the most current updates is invaluable when searching for points of interest along an unknown route, or when trying to re-route around heavy traffic. Using a smartphone as a GPS receiver taps into the idea of a smartphone as an all-in-one device. Many smartphone users always have their phones with them such that they will always have a GPS navigation tool on-hand. Smartphones are designed to be easily held in one hand, and thus are often the preferred choice for navigation while walking or biking. Smartphone GPS navigation apps not only have the ability to provide real-time traffic detection and avoidance, but can provide other services such as check gas prices. Additionally, the ability to call a business or tourist attraction to check hours and rates with a simple tap is one more advantage of using smartphone GPS navigation apps.

Smartphone GPS navigation apps allow for easy address entry. Smartphones allow users to look up a contact in their phone's address book and then navigate to that address without any additional typing. Also, addresses found via a smartphone Internet search or through another application can be sent directly to the GPS navigation app.

Current geo-locations data management systems such as the smartphone GPS based navigation apps are based on pinpointing the location of each individual's smartphone using the global positioning system (GPS) however, the geo-location position captured at any particular time does not confirm that the individual user (often owner) of the smartphone is, was also present at the time the geo-location position of their smartphone was captured. Furthermore, the data captured of the individual's location does not guarantee that this individual is the sole and unique owner of the smartphone used. United States Patent Application Publication Number 2016-0021535 and U.S. Pat. No. 9,801,058, which publication and patent are incorporated herein by reference in their entireties, provide a biometric based user geolocation verification technology using a telecommunications network.

Blockchain Deficiencies

Some people in the blockchain industry have pointed out that blockchain has become overhyped, when, in reality, the technology has limitations and is inappropriate for many digital interactions. One often cited example is if a blockchain is used as a database, the information going into the database needs to be of high quality. The data stored on a conventional blockchain is not inherently trustworthy, so events need to be recorded accurately in the first place. The phrase 'garbage in, garbage out' holds true in a blockchain system of record, just as with a centralized database. If these inputs into the blockchain can be verified and trustworthy the application of blockchain technology is greatly increased. As described in detail below, the present invention addresses this need providing efficient and effective biometric based blockchain user or individual authentication and further for authentication of the individual's physical location, described herein as Geolocation.

SUMMARY OF THE INVENTION

This invention is directed to a cost effective, efficient, method and system for blockchain network management. The method according to one aspect of the present invention comprising the steps of: a) providing a blockchain network configured for providing individual blockchain users with access to a blockchain; b) providing individual blockchain users with a smartphone having a GPS receiving unit associated with a communications network and with a biometric user identification technology coupled to the smartphone; c) identifying an individual blockchain user with the biometric user identification technology by obtaining biometric characteristics that are unique to each human via the communications network; d) authenticating the individual blockchain user's identity and geolocation in an authentication network coupled to the communications network; and e) providing access of authenticated individual blockchain users to the individual blockchain.

A blockchain network management system according to the invention comprises a) a blockchain network configured for providing individual blockchain users with access to a blockchain; b) a communication network for individual blockchain users with a smartphone having a GPS receiving unit; c) a biometric user identification technology coupled to the smartphone individual blockchain users, wherein the system is configured for identifying an individual blockchain user with the biometric user identification technology by obtaining biometric characteristics that are unique to each human via the communications network; d) an authentication network coupled to the communications network for authenticating the individual blockchain user's identity and geolocation, wherein the system provides access of authenticated individual blockchain users to the individual blockchain.

The blockchain network management method according to one feature of the invention provides wherein providing access of authenticated individual blockchain users to the individual blockchain includes writing data to the blockchain, including data associated with each authenticated user, or reading data from the blockchain, or both.

The blockchain network management method according to one feature of the invention includes that providing access of authenticated individual blockchain users to the blockchain includes issuing access tokens to individual users.

The blockchain network management method according to one feature of the present invention provides wherein the biometric user identification technology coupled to the smartphone is a passive biometric user identification technology, and may be a continuous heart based biometric user identification technology. An ECG wristband transmitter is a preferred biometric user identification technology although fingerprint or facial recognition may also be effectively used in certain applications.

The blockchain network management method according to one application of the invention provides wherein the blockchain is a smart contract forming an account holding object.

The blockchain network management method according to the invention may provide wherein the blockchain network utilizes a decentralized application design using a storage and distributing file sharing platform.

The blockchain network management method according to one of feature of the invention provides wherein select user information associated with the blockchain is stored off of the blockchain.

The present invention in one embodiment yields a blockchain network management system that includes a communications network, a private blockchain network, a heart rate wristband transmitter worn by an individual, a DApp or a decentralized application, a smart contract, a token layer, and a database file sharing platform, such as SWARM and an Etherium Virtual machines platform. The SWARM platform is a distributed storage platform and content distribution service. The primary objective of the SWARM platform is to provide a sufficiently decentralized and redundant store of Ethereum's public record, to store and distribute DApp code and data as well as block chain data. The SWARM platform holds the negotiation logic that will be used to arbitrate the issuance of tokens in order to access and consume the private blockchain goods and services, such as data-as-a-service. Smart contracts represent the business logic of DApp code, and it contains code functions and can interact with other contracts via the SWARM platform, to make decisions issuing tokens for access, store data, and send messaging. Smart Contracts are a developed with SOLIDITY which is a contract-oriented and high-level language and is designed to target the Ethereum Virtual Machine (EVM) that serves as a runtime environment.

The blockchain network management system and method describes how a token-based geo-location access to an individual's geolocation data service authenticated by heart-based biometrics will be consumed and monetized using smart contract and tokens. The present systems and method describes a smart contract on the private blockchain network such as may be found between the banks, the courts, hospitals, the lawyers and other entities; and wherein for an exchange of tokens (e.g., BITCOIN type cryptocurrency) access to the private blockchain is given to authenticated users, authenticated by using heart-based (ECG) wristband biometrics, fingerprint based biometric or facial recognition based biometrics figuratively tethering the individual to their smartphones as proof-of-presence.

The token and smart contract schema that grants access to a private blockchain network in the present invention provides a process that gives access to the private blockchain network to banks and other entities and establishment who wish to validate and confirm in real time the presence of a biometrically verified individual's geo-location at a point of time during a bank transaction. The present invention systems and method provides how the communications network, the private blockchain network, the tokens, smart contracts, and the software management grants users and vendors access to the private blockchain network during point of sale transaction in order to access a particular block on the blockchain that contains an individual's geo-location certified by the individual's biometric heart signature, or biometric fingerprint signature or biometric facial recognition signature as well as a certification of user proximity to the point of sale. This geo-location validation obtained by vendors from this private blockchain may for example, then used by vendors to approve or turn down a pending transaction.

The blockchain network management system and method described may further include marking recordings, writing the recordings data on the private blockchain, such as pictures, videos or audio recordings, taken with the individual smartphone with the geo-location software and the individual wearing the wristband where the image was taken, the time the image was taken, and the authenticated geo-location data of the individual when and where the image was taken. The method will grant access on the blockchain and allow for authentication of any image, video, audio recording and/or sensor reading recorded by the smartphone to write the data on the private blockchain of the location and individual making the record via the smartphone available to be consumed through a contract, a token or access-pass to exploit an on the blockchain the authenticated geolocation data-as-a-service-service.

The method for authenticating an individual's geo-location via a communication network, a private blockchain network, A DApp, smart contracts, tokens, a distributed file sharing called swarm of one aspect of the invention further includes limiting access to at least some of the smartphone applications, e.g. banking applications, to the individual as verified on the blockchain by the biometric user identification technology. Alternatively the present invention may provide wherein the individual owner of the smartphone interaction with Internet-Of-Things devices where the data is recorded on the private blockchain and is rendered available to be consumed on the blockchain through a contract, a token as an access-pass to be exploit and monetize the authenticated geolocation data as service. The present invention system and method secures that the both the individual, e.g., the owner of the smartphone, and the associated smartphone were both present at same geo-location position of the smartphone through global positioning system (GPS) when the data was captured and logged-in in to the private blockchain database by the blockchain geo-location smart contract software management utility. Furthermore, the present system and method secures that the smartphone used when the data was captured and written to the blockchain indeed belongs to the individual at the time the geo location position GPS of the smartphone was captured and logged-in.

These and other aspects of the present invention will be clarified in the description of the preferred embodiment of the present invention described below in connection with the attached figures in which like reference numerals represent like elements throughout.

BRIEF DESCRIPTION OF THE DRAWINGS

FIG. 6 is a schematic diagram of a process for Individual to social networks data integrations in accordance with one aspect of the system of FIG. 1.

BRIEF DESCRIPTION OF THE PREFERRED EMBODIMENTS

Figure 1:
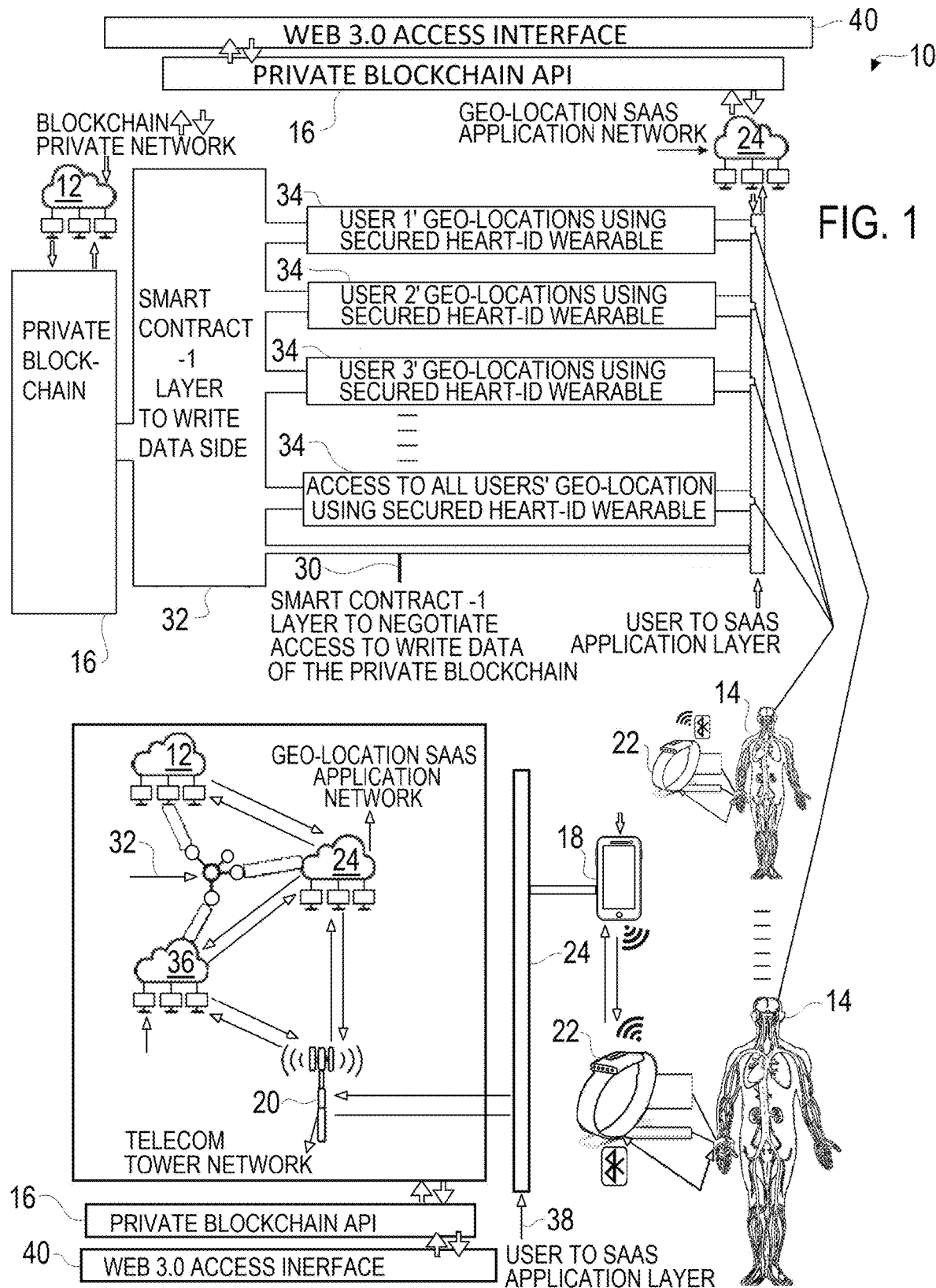
FIG. 1 is a schematic diagram of a blockchain network management system and associated method in accordance with the present invention.
Figure 2:
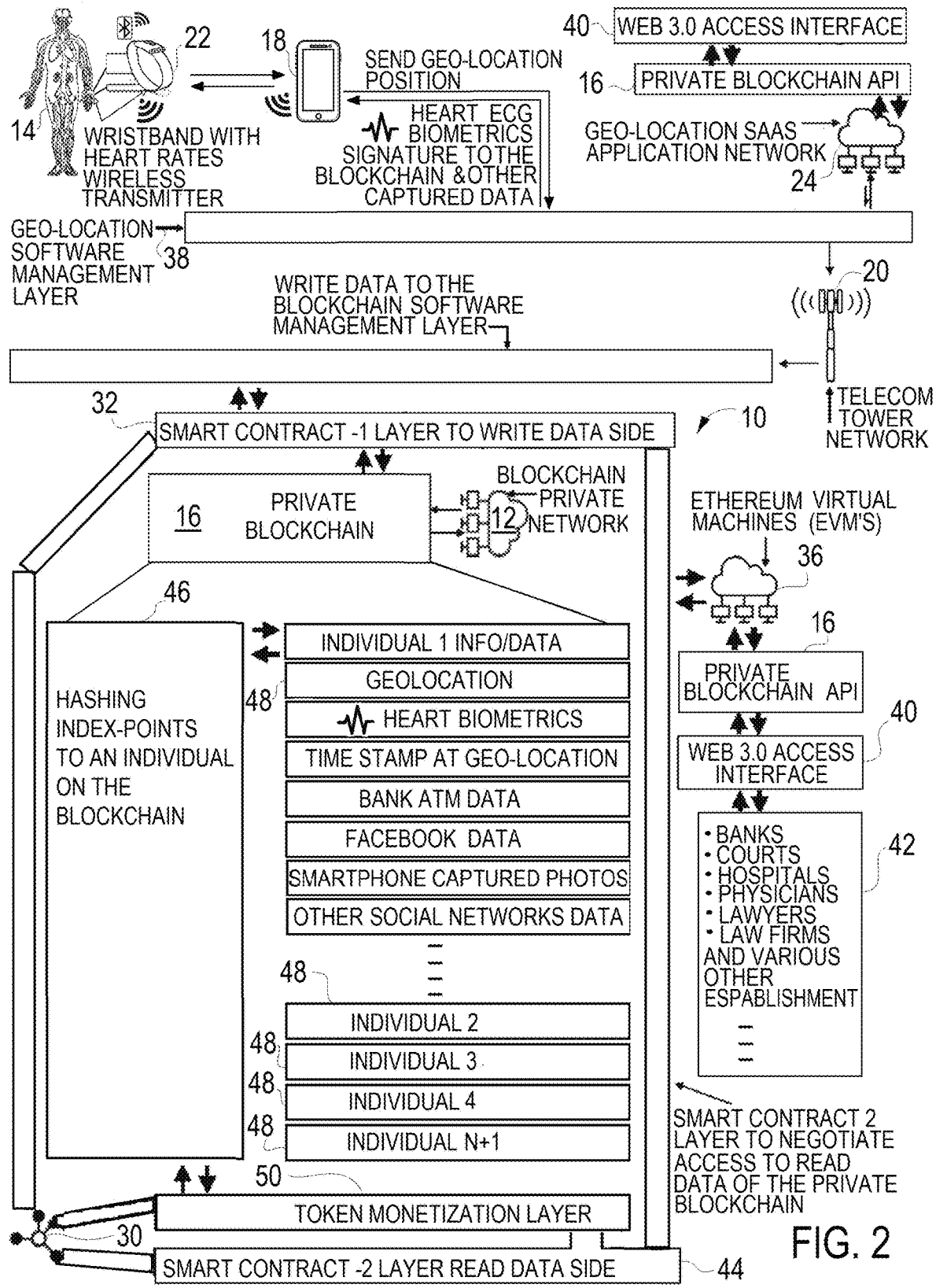
FIG. 2 is a schematic diagram of a blockchain network management system and associated method in accordance with the present invention.

As detailed below and shown in the figures, the present invention provides for blockchain network management [10] scheme associated with a system and method. The method may be summarized as comprising the steps of: a) providing a blockchain network [12] configured for providing individual blockchain users [14] with access to a blockchain [16]; b) providing individual blockchain users [14]

with a smartphone [18] having a GPS receiving unit associated with a communications network [20] and with a biometric user identification technology [22] coupled to the smartphone [18]; c) identifying an individual blockchain user [14] with the biometric user identification technology [22] by obtaining biometric characteristics that are unique to each human via the communications network [20]; d) authenticating the individual blockchain user's identity and geolocation in an authentication network [24] coupled to the communications network [20]; and e) providing access of authenticated individual blockchain users [14] to the individual blockchain [16].

Blockchain Network [12]

The blockchain network [12] is a peer-to-peer network collectively adhering to a protocol for inter-node communication and validating new blocks 52 of the blockchain 16. One specific type of blockchain network [12] is an ETHEREUM network [36] and is defined as an open-source, public, blockchain-based distributed computing platform and operating system featuring smart contract functionality. It supports a modified version of Nakamoto consensus via transaction-based state transitions. The present invention is particularly applicable to implementing smart contracts so the ETHEREUM network [36] is expressly illustrated as a preferred option, but other known blockchain networks [12] may be utilized.

The blockchain network management [10] method according to invention includes that the step of providing access of authenticated individual blockchain users [14] to the individual blockchain [16] includes writing data to the blockchain, including data associated with each authenticated user [14], or reading data from the blockchain, or both.

The access of, or by, the authenticated individual blockchain users [14] to the individual blockchain [16] may be directly or via a vendor [42] on behalf of the user [14] similar to agents of the user [14]. The vendor [42] such as a bank, hospital, court, physician, lawyer, law firm, real estate agents, inspectors, researchers and other interested parties. The bank may be reviewing a commercial real estate property including the purchase terms and associated sub lease terms, title search, inspections and the like on a blockchain [16] to approve or deny a loan, the lien of which would likely be updated on the associated blockchain [16].

The hospital, physician and medical professionals may be seeking access to a blockchain [16] associated with the patient's health, with the medical records blockchain [16] complying with HIPPA requirements essentially automatically, and the future treatments to the patient would update the blockchain [16]. Any number of vendors [42] may be seeking to access a blockchain [16] on behalf of a user [14] for an infinite number of reasons.

Smartphones [18]

The term smartphone [18] is used conventionally within this application and may be described as a hand carried personal computer with a mobile operating system with the capabilities of a cell phone. Smartphones [18] are typically pocket-sized hand held devices, but not exclusively. One category or subset of smartphones [18] is a wrist-based smartphone [18], sometimes called a smartwatch. Wrist based communication devices have held a long fascination with the United States public dating back to at least Jan. 13, 1946, with the appearance of the 2-Way Wrist Radio in a Dick Tracy comic which became one of the strip's most immediately recognizable icons. By the end of 2013 there were at least three commercial smartwatches incorporating smartphone technology including Samsung GALAXY GEAR, Sony SMARTWATCH 2, and the Qualcomm TOQ. The most well-known smartwatch was the APPLE WATCH announced in 2014. The present invention can be implemented with the smartphone [18] being a smartwatch with smartphone capabilities. See also U.S. Patent Publications 2018-0049028 and 2019-0357049. Additionally, it is anticipated that such a system could further integrate the wristband [22] and the smartphone [18] into a single integrated component. The integrated smartwatch (smartphone [18]) and bracelet [22] can yield an easier implemented system and prevents the phone [18] from being removed from the wristband [22], however the operation of the system would remain the same in such an integrated system. As a handheld smartphone [18] is more common than a wrist mounted smart watch type smartphone [18], the system is generally described herein in connection with the handheld version of the smartphone [18].

The communications network [20] is the conventional smartphone communications network associated with the particular smartphone [18].

Biometric User Identification Technologies [22]

There are many types of biometric user identification technologies [22], but there are several types that are most commonly used. Biometric user identification technologies [22] is basically the recognition of human characteristics that are unique to each human, which can include fingerprints, hand geometry, retinal scanning, iris scanning, facial recognition, vein pattern, voice recognition, DNA, electrocardiograms, and more. These are discussed in detail in United States Patent Application Publication Number 2016-0021535 and U.S. Pat. No. 9,801,058, which publication and patent are incorporated herein by reference in their entireties.

The present invention prefers to utilize a wrist based ECG acquisition unit [22], such as the biometric ECG bracelet manufactured by Cardia. The wrist worn ECG is the preferred biometric identification technology [22] because it is passive and monitors effectively continuously and is effectively universally applicable to all smartphones [18]. The alternative biometric user identification technologies discussed above could be implemented into the system with the addition of an associated scanner and the ability of the scanner to transmit meaningful effective and verifiable results.

The blockchain network management [10] method according to the invention provides wherein the biometric user identification technology [22] is coupled to the smartphone [18] is a passive biometric user identification technology. Passive within this application provides that the user [14] does not have to do separate steps for implementing the biometric user identification technology [22]. For example, the preferred method is a wrist mounted ECG transmitter that is passive and continuous and heart based technology. Biometric user identification technology [22] that is used to open/access the smartphone [18] may also be considered a "passive" application in this application because the user [14] is not actively doing another separate authentication step. Biometric user identification technology [22] that is used to open/access the smartphone [18] must yield effective, usable and verifiable biometric user identification data to the authentication network [24] to be acceptable. It is noted that some smartphone applications implement "proprietary" biometrics that cannot be verified and/or utilized by the authentication network [24]. The wrist mounted ECG transmitter [22] avoids these difficulties making it universal to essentially all smartphones [18] and is preferred.

The authentication network [24] must be coupled to the communications network [20] to obtain the GPS position data of the user [14] and effective, usable and verifiable biometric user identification data from the biometric user identification technology [22]. Additionally, the authentication network [24] receives indication that the biometric user identification technology [22] is in sufficient proximity to the smartphone [18] to verify the presence of the user [14]. As shown in FIG. 6 the authentication network [24] can maintain a record [48] of tracked activities. The full scope of tracked activities and records is detailed in United States Patent Application Publication Number 2016-0021535 and U.S. Pat. No. 9,801,058.

Tokens 50

The blockchain network management [10] method according to invention provides wherein providing access of authenticated individual blockchain users [14] issuing access tokens [50] to individual users. The present invention may alternatively be described in part as an on the blockchain [16] geo-locations software management utility. The issuance of a token [50] may be utilized to gain access to the private blockchain network [12 or 36] in order to gain access to an individual's geo-location's position to authenticate an individual's geo-location for proof-of-presence of the individual user [14] at that location via a communication network [20] the authentication network [24] and the private blockchain network [12 or 36]. This invention is directed to a cost effective, efficient, on the blockchain data storage method and system and a on the blockchain [16] consumption of good and services monetization system of an individual's authenticated geolocation data. As discussed below, the blockchain [16] may store only hashes [54] of the individual's geolocation data on-chain or in blocks [52] with the remaining data [46] stored off chain in the cloud, allowing users [14] to easily verify the integrity of the data and the blockchain [16] without actually paying the massive costs of storing excessive data on the blockchain [16] itself. The actual or full individual's geolocation authenticated data [48] may be stored on the cloud or other communications network using SWARM [30].

Figure 4:
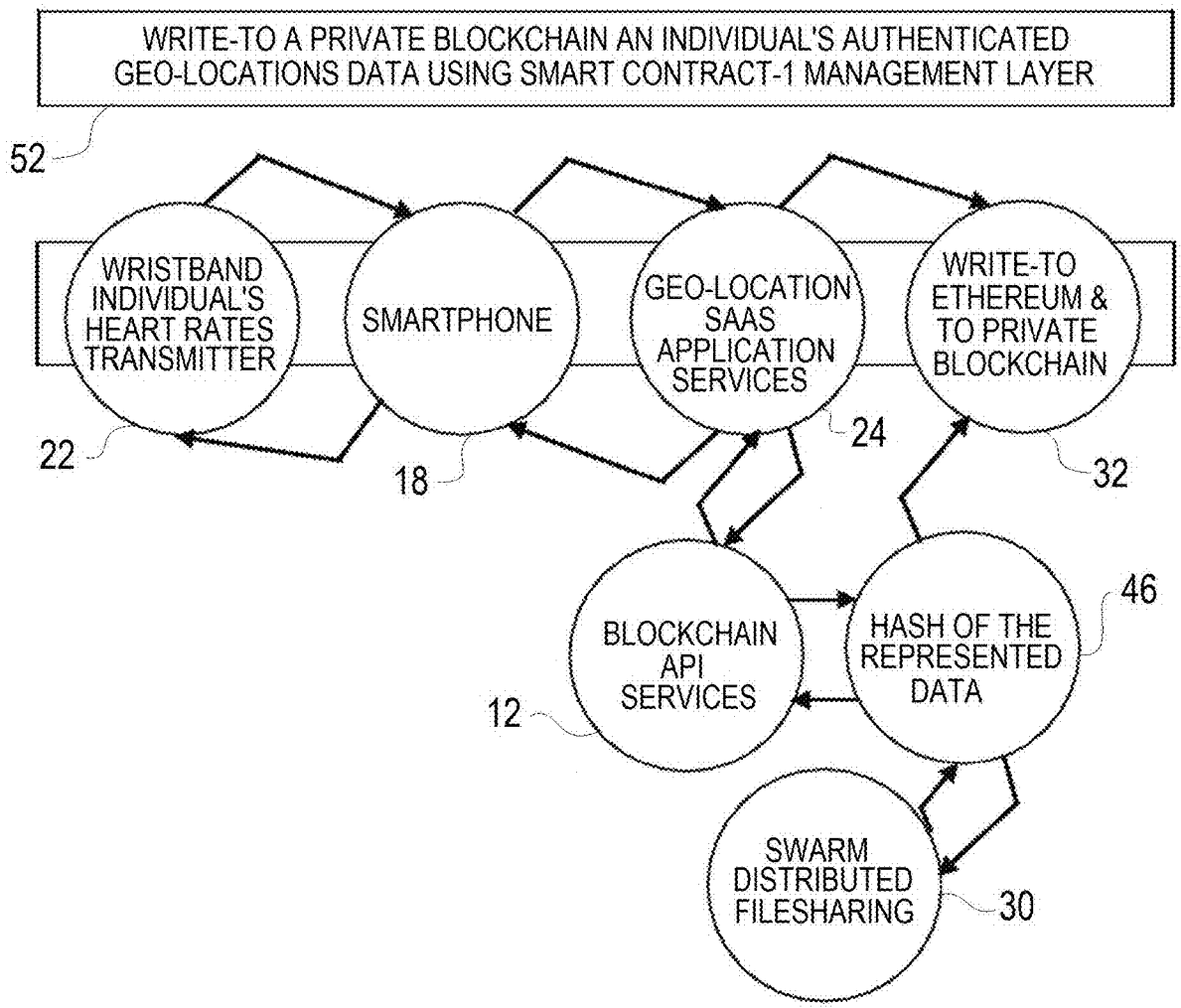
FIG. 4 is a schematic diagram of a private blockchain for a Write-to a Private Blockchain of individual's authenticated geo-locations data using smart contract-1 layer in accordance with the present invention.
Figure 5:
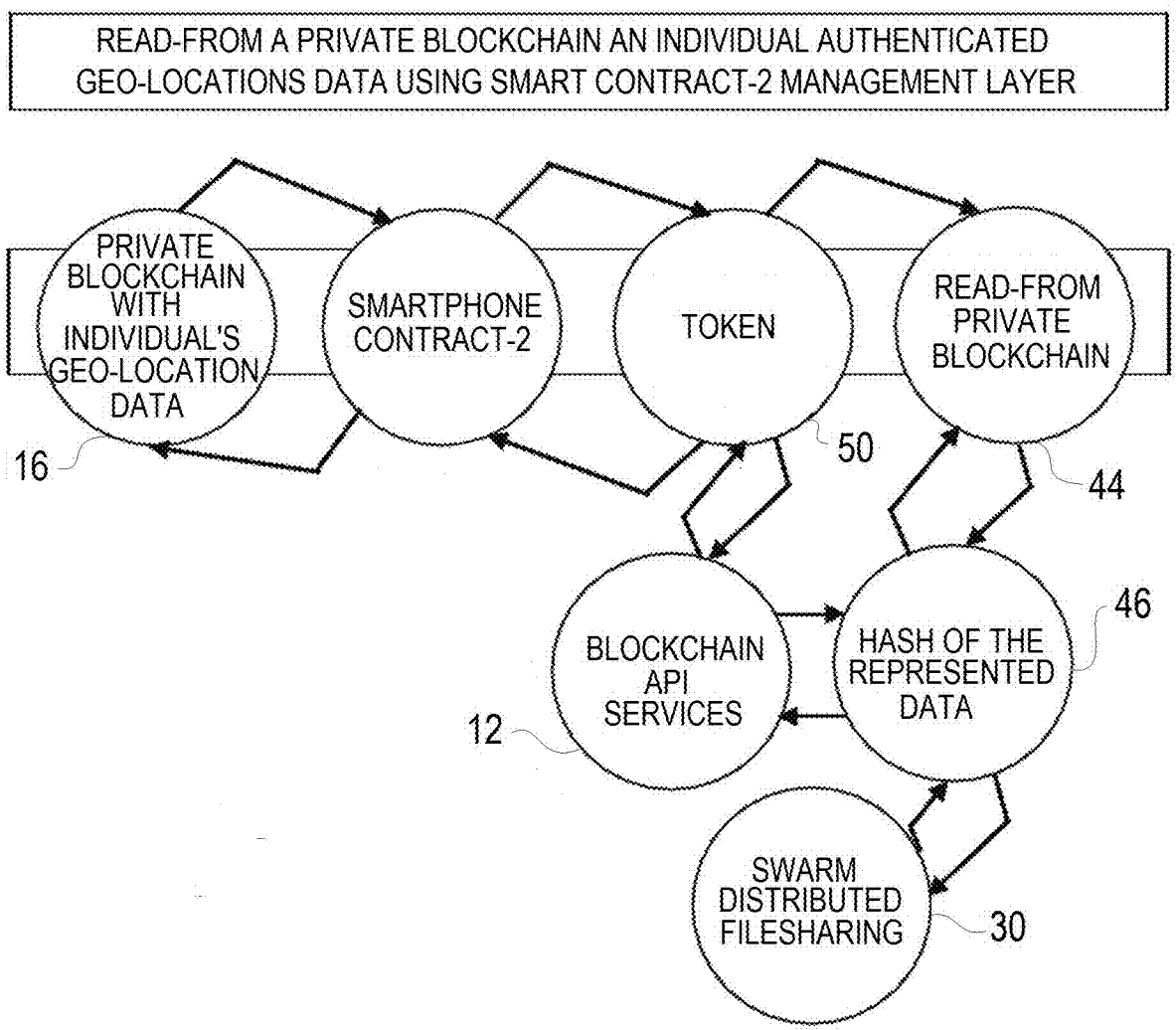
FIG. 5 is a schematic diagram of a private blockchain a Read-from a Private Blockchain of individual's authenticated geo-locations data using smart contract-2 layer in accordance with the present invention.

The present invention provides a systems and method of a communications network [20], a private blockchain network [12 or 36] and a token [50] issuance schema that grants access to the private blockchain network [12 or 36] and associated blockchain [16]. The system and method provide a how to write-to-the-blockchain in real-time the individual's geo-location at a point of time data, the individual's heart-rate signature generated by the wristband data as proof-of-presence of the individual at a particular location as detailed in FIG. 4. The token [50] schema that yields a process that gives access to the private blockchain network [12 or 36] and associated blockchain [16] to vendors [42] such as banks and other entities and establishments who, for example, wish to validate and confirm in real time the presence of an individual's geo location at a point of time during a transaction.

As an example, a bank (vendor [42]) may wish to validate that a bank transaction that is actually taking place is indeed being carried by the user [14] who is the actual holder of the credit card being used. The present invention issues a token [50] for access for the bank to use and points to the private blockchain [16] where the individual [14] of concern's geo-location certified data by the individual's heart signature is located. Once the validation of the individual's geo-location takes place the bank then can approve or deny the transaction. Thus, the Token [50] will be used as Ticket or access pass to exploit an authenticated geolocation service associated with the blockchain [16].

The present invention provides that this token-based geo-location access to individual's geolocation data service will generate a token portability that can be opened, as it can be limited by a window in time-time interval; for example to track a person from an hour h1 to h2; this is a filter by time. The blockchain network management [10] can also limit the tracking in the space, for example, where a user [14] or associated vendor [42] wants to be informed of what moves in a specific area, then the blockchain network management [10] design tokens that make the coupling between time and space as desired for the associated user [14]. Again, the Token [50] will be used as Ticket or access pass to exploit the authenticated geolocation service of the blockchain network management [10].

Consistent with the meaning in the art and within this application a token [50] is a term for a type of privately issued currency. Traditionally, sovereign governments issued currency and set its terms and governance; in essence directing how our economy works with money as the exchange medium for value. With the blockchain [16], there are now new types of organizations (and soon, more of the existing type) who are issuing their own currency in the form of digital money, or cryptocurrency, and they are setting their own terms and rules around its operations, in essence creating new self-sustainable mini-economies.

The blockchain network management [10] may implement the ERC20 token standard which describes the functions and events that an Ethereum token contract has to implement. Following is an interface contract declaring the required functions and events to meet the ERC20 standard: contract ERC20 [function totalSupplyO constant returns (unit totalSupply); function balanceOf(address_owner) constant returns (unit balance); function transfer(address_to, unit_value) returns (bool success); function transferFrom (address_from, address_to, unit_value) returns (bool success); function approve(address_spender, unit_value) returns (bool success); function allowance(address_owner, address_spender) constant returns (unit remaining); event Transfer(address indexed_from, address indexed_to, unit_value); event Approval(address indexed_owner, address indexed_spender, unit_value);}

Smart Contract

As discussed below, the blockchain network management [10] method according to the invention is particularly useful where the blockchain [16] is a smart contract forming an account holding object. Additionally, the blockchain network management [10] method according to the invention is advantageous where select user information [48] associated with the blockchain [16] is stored off of the blockchain [16].

A smart contract, also known as a crypto-contract, is a computer program that directly controls the transfer of digital currencies or assets between parties under certain conditions. These contracts are stored on blockchain [16], which is a decentralized ledger that also underpins bitcoin and other cryptocurrencies. With the blockchain [16], the need for 3rd party arbiter is obsolete. Orders to buy and sell are matched and executed using an escrow system while the network [12 or 36] acts as a validator. A commercial Example: COUNTER-PARTY, a decentralized exchange that lets users create their own digital assets that can then be exchanged. In the present invention, Token [50] may be used as Ticket or access pass to exploit the authenticated geolocation contract for a currency exchange.

Smart contracts represent the business logic of a DApp discussed below. Smart contracts contain code functions and can interact with other contracts, make decisions, store data, and send ether to others. Smart contracts may be considered analogous to a vending machine that takes in money as inputs and are set to distribute your choice of snack or drink. Smart Contracts may be analogously considered as a virtual vending machine. Smart Contracts may be developed with SOLIDITY which is a contract-oriented and high-level language and is designed to target the Ethereum Virtual Machine (EVM) or networks [36] that serves as a runtime environment. The management [10] of the invention may deploy multiple smart contracts: one to record authenticated geolocations (writing in blockchain [16]) and another to extract these positions according to predefined criteria and a possible last one to issue a token [50] to permit access to the $1^{st}$ and/or 2nd contract.

Thus, a smart contract, also known as a crypto-contract, is a computer program that directly controls the transfer of digital currencies or assets between parties (users [14]) under certain conditions. These contracts are stored on blockchains [16].

Blockchain smart contracts are account holding objects on the blockchain [16]. They contain code functions and can interact with other contracts, make decisions, store data, and send info to others. Contracts are defined by their creators, but their execution, and by extension the services they offer, is provided by the blockchain network [36] itself. They will exist and be executable as long as the whole network [36] exists. Smart contracts help users [14] exchange money, property, shares, in our present systems and method it's the individual's geo-location authenticated by the wristband heart rate signature tethered to the smartphone data (collectively 34) that is being exchanged for access on the private blockchain [16] as a value in a transparent, conflict-free way while avoiding the services of a middleman.

Again one way to describe smart contracts is to compare the technology to a vending machine. Ordinarily, one would go to a lawyer or a notary, pay them, and wait while you get the document. With smart contracts, the user [14] simply drops a bitcoin into the vending machine (i.e. ledger), and an escrow, driver's license, or whatever drops into your account. More so, smart contracts not only define the rules and penalties around an agreement in the same way that a traditional contract does, but also automatically enforce those obligations and track compliance.

The present systems and method describes a smart contract on the private blockchain network [36] between the venders [42] such as banks, the courts, the lawyers and other entities for an exchange of bitcoin for an access pass or token [50] to exploit the authenticated geolocation services using heart rate wristband [22] tethering the individual [14] to their smartphones [18] as proof-of-presence.

If the block chain [16] is trusted, then the transactions that are stored in it are trusted too. The Ethereum project backing the network [36] takes the block chain principle and adds the ability to create smart contracts on the block chain [16]—essentially apps that can hold value, store data, and encapsulate code to perform computing tasks. Like BITCOIN, ETHEREUM has a currency—in this case, called ETHER. ETHER is mined by nodes that verify transactions before being stored in a shared-consensus block chain [16]. ETHER can be transferred between accounts (public keys) and smart contracts themselves.

Smart contracts allow anonymous parties to enter into binding agreements, with each participant [14] having full transparency on the deal being made. Value can be transferred between accounts or held in escrow inside the smart contract itself. As the contract is just code, the application is only limited by the developer's imagination. As discussed above a blockchain, blockchains can be used for a wide variety of applications, such as tracking ownership or the provenance of documents, digital assets, physical assets or voting rights and in the present invention to store the individual's heart rate signature along with the individual's geo-location verified by the wristband tethered to the smartphone.

OFF CHAIN STORAGE: As alluded to above BlockChain presents a number of challenges to developers, not least of which is the fundamental difference between programming for a shared virtual computer versus, say, some high-powered machine. One of the challenges of working with this platform is data storage. In typical environments, developers can practically treat data storage as an unlimited resource: Storage is cheap. However, it's commonly stated it's not suggested to store large data on-chain, but why? Technically it's possible, the only obstacle is the astronomical expense compared to every other option under the sun. Indeed, the cost to store data on the Ethereum blockchain is designed to be prohibitive, for example storing 1 GB would require 32,000 ETHER a cost of around $20,000,000! Therefore, the preferred method of the present invention is storing the bulk verification and user data [48] off-chain on the "cloud" via Swarm [30] or the like and storing hashes [54] of the data [48] on-chain that are coupled to keys [46] off-chain, allowing users [14] to easily verify the integrity of the data without actually paying the massive costs of storing on the blockchain [16] itself. DAPP [28] and SWARM [30]: The present invention implements a DApp or a decentralized application [30] and has a back-end programming language code running on a decentralized peer-to-peer network [12 or 36] while the server part of a traditional or classic application is running on a centralized server. A DApp [30] can have a front-end code and user interfaces written in any language that can make calls to its backend. DApp [28] is responsible in servicing out calls or requests to data-as-a-service on the private blockchain [16] and acts as an automatic arbitrator granting or denying access to the goods and services in present invention to the data stored on the private blockchain [16] and coupled thereto with hashes [54] and keys [46]

The DApp [28] uses SWARM [30] to manage data storage and can interact with other contracts via WHISPER protocol, to make decisions issuing tokens [50] for access, store data, and send messaging. SWARM [30] is distributed peer to peer computing file-sharing database where all the smart contracts logic is held when negotiation between various blockchain is taking needed. Whisper is a communication protocol for DApps [28] to communicate with each other. Messages can be encrypted with a specific key for privacy. Indirectly supports broadcast, multicast and unicast. Whisper is a high latency and low bandwidth messaging protocol.

The blockchain ecosystem involves multiple actors and tools. In our present invention case here are the blockchain [16] blockchain blocks [52] with hashes [54] pointing to off chain data [48] via keys [46] allowing user [14 or venders [42] to easily verify the integrity of the data [48] without actually paying the massive costs of storing on the blockchain [16] itself an individual's authenticated geolocations data [28], an Ethereum Virtual Machines Platform or (EVM's) or network [36], a SWARM or a distributed storage platform [30] and content distribution service. An authenticated geolocation network 24 works with a communications network [20] using wristband or other verification technology [22] worn by an individual [14] associated with a smartphone [18] of the user [14]. Additionally adding players and tools are outside blockchain(s) [16] wanting access to the subject private blockchain [16], Contract-1 layer holding embedded contracts, conditions or rules Contract-2 layer holding embedded contracts, conditions or rules Token [50] and associated Tokens issuing layer.

The contract layers can call each other directly to exchange the embedded logic within the layers that contain the negotiation or rules of engagement under which access or exchange can take place between the various blockchains [16] where in the present invention it will encompass the exchange of the individual's geolocation authenticated data as goods and services for a currency exchange in the smart contract.

The invention may best operate via a Web 3.0 interface [40] outside the blockchain [16] to interact with the blockchain's smart contracts in order for outside records (e.g., A bank's blockchain, a hospital's blockchain, a physician's blockchain and other establishments' blockchain) to gain access to read an individual's updated geolocation data associated with the blockchain [16]. For example from a web 3.0 interface [40], the invention can interact with DApp [28] directly and enters a contractual agreement then contracts.

In the Web 1.0 interfaces, centralized media and content sites provided information to readers; and in the Web 2.0 interfaces, social media sites (YouTube, Medium, Facebook) and collaborative websites and services (Wikipedia, Google Docs, Dropbox) allowed users to publish, share, and collaborate on content themselves in the "social web". In the Web 3.0, applications, users, and connected devices interact directly with each other. Decentralized apps can call and share the same user-owned data stored on blockchains' open data layers. Additionally, connected devices (such as home devices or autonomous cars) can transmit their data and transfer value over blockchain layers to users and other devices via smart contracts (discussed below). It is a "user-owned, decentralized web."

Management

The present invention provides a systems and method of a blockchain network management [10] and a token [50] issuance schema that grants access to the private blockchain network' [12 or 36] data-as-a-service. The present invention is directed to a blockchain network management [10] system and method that provides a write-data-to-a-private-blockchain in real-time of an individual's geo-location at a point of time, where the data stored on the private blockchain [16] (or off chain) includes the individual's heart-rate biometric signature generated by the wristband as proof-of-presence of the individual's geolocation at a particular point in time and place. The present invention provides a systems and method of a communications network, a private blockchain network, a heart rate wristband transmitter worn by an individual, a contract and a token schema that grants access to a private blockchain network. A contract schema that provides a process that gives access to a private blockchain network to banks and other entities, and establishment who wish to validate and confirm in real time the presence of an individual's geo-location at a point of time during a transaction. The present invention provides a systems and method of a communications network, a private blockchain network, a heart rate wristband transmitter worn by an individual, and a smart contract. Smart contracts represent the business logic of a DApp or a Decentralized application and it contains code functions and can interact with other contracts via swarm, to make decisions issuing tokens for access, store data, and send messaging.

The present invention provides a blockchain network management [10] method and system including a heart rate wristband transmitter or equivalent technology [22] worn or used by an individual [14], A decentralized application [28], 2 smart contracts and a token [50] for access issuance logic layer: one to record the individual's authenticated geolocations (writing the data into the private blockchain [16] and off chain) and another to extract these positions according to predefined criteria and a token layer to issue or to grant to the 2nd contract to access the private blockchain [16].

The present invention provides a systems and method for blockchain network management [10] including a communications network [20], a private blockchain network (Preferably Ethereum Virtual machines platform or network [36]), a heart rate wristband transmitter or equivalent technology [22] worn by an individual [14], a DApp or a decentralized application [28], 2 smart contracts and a token layer, and a database file sharing called Swarm [30]. Swarm is a distributed storage platform and content distribution service. The primary objective of Swarm is to provide a sufficiently decentralized and redundant store of Ethereum's public record, to store and distribute DApp code and data as well as block chain data. Swarm holds the negotiation logic that will be used to arbitrate the issuance of token [50] in order to access and consume the private blockchain goods and services in our case data-as-s-service The present invention provides token-based geo-location access to an individual's geolocation data service authenticated by Heart rate biometrics will be consumed and monetized using smart contract and tokens. The present systems and method describes a smart contract on the private blockchain network between the banks, the courts, hospitals, the lawyers and other entities for an exchange of bitcoin or tokens for an access pass to exploit the private blockchain' authenticated geolocation services using heart rate wristband biometrics tethering the individual to their smartphones as proof-of-presence.

This invention is directed to a cost effective, efficient, system [10] for authenticating, accessing, acquiring, storing and managing the geo-location position data of each individual [14] via a communication network [20], a private blockchain network [12 or 36] to write-to and read-from the individual's authenticated data [48], smart contracts, issuing a token [50] to consume as-a-service the goods and services of the stored hashes [54] of the block [52] on-chain of the geo-location data and the actual data [48] off chain. The system uses a biometric user identification technology [22], and in one preferred embodiment a continuous and passive wristband-based electrocardiogram for the technology [22]. This invention is directed to a cost effective, efficient and on the blockchain data monetization system for private blockchain networks [12 or 36]. This invention is directed to a cost effective, efficient on the blockchain monetization of the stored ECG records of an individual's heart electrocardiogram captured history via the wristband worn by an individual [14], with access arbitration done via smart contracts for granted access issued tokens [50].

This invention is directed to a cost effective digital rights management (DRM), efficient on the blockchain monetization of the stored geolocation authenticated photo(s) data records of the individual [14] who actually captured the photo or other recording via smartphone [18] while wearing the wristband. The blockchain [16] may include an individual's authenticated profile records data of the history records of the captured photo, place picture was taken, time the picture was taken all negotiated through swarm [30] executed via a read-from the blockchain [16], with access arbitration via smart contracts for granted access issued in tokens [50].

Figure 3:
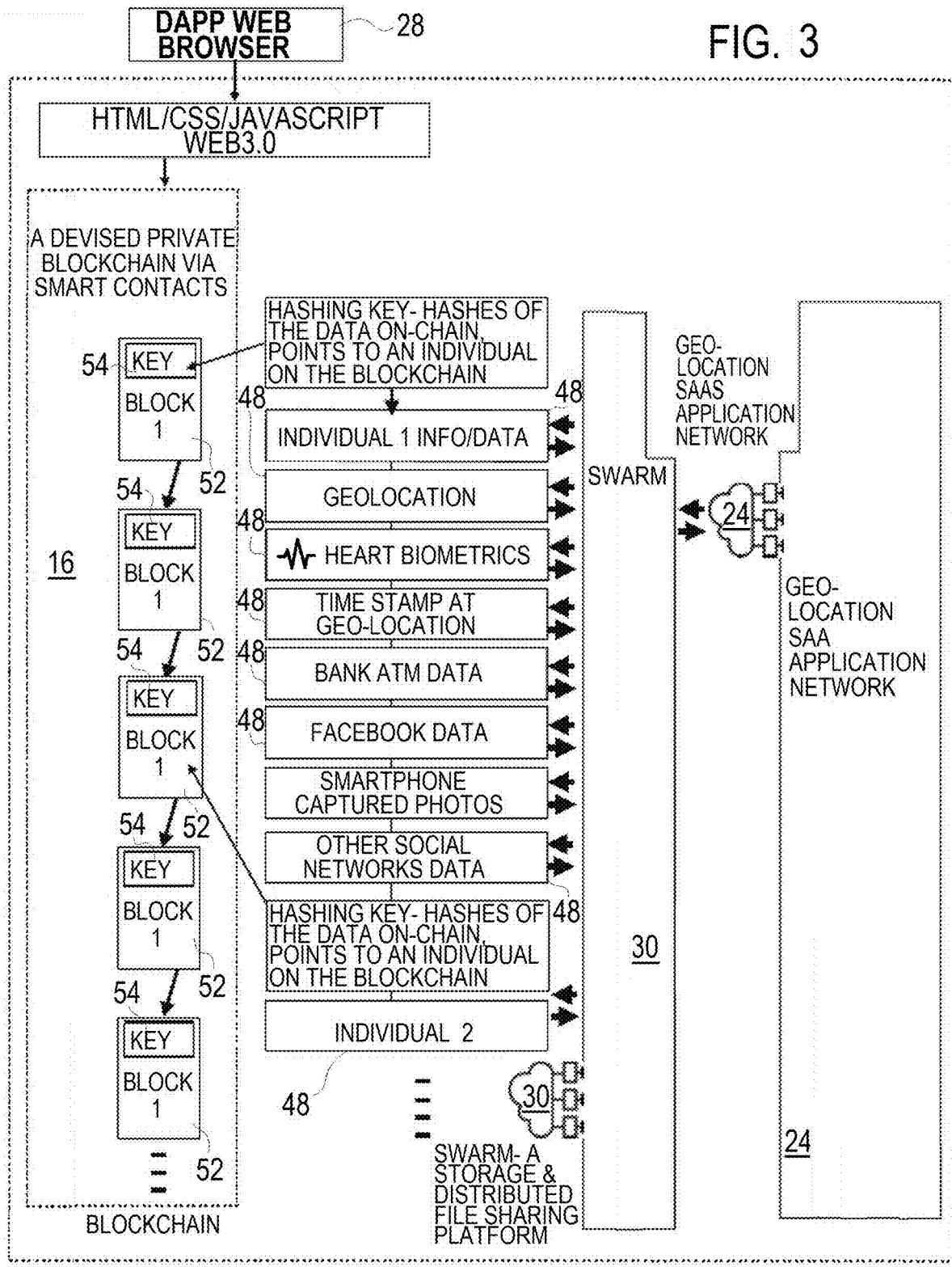
FIG. 3 is a schematic diagram of writing to a private blockchain of including off chain maintaining of an individual's authenticated geo-locations data in accordance with the present invention.

This invention is directed to a cost effective, efficient on the blockchain data storage and security, wherein there is writing only the hashes [54] of the data on chain [16] and the writing of the actual data [48] of the individual's authenticated geolocation off chain. BlockI, block2, block3, block4, block(n+I) as books or blocks [52] added in the chain [16] which contains transactions which represent a change of state in the database; the hashes [54] of the data [48] of an individual's records, the key [46] that points to the actual individual records are verified by multiple nodes in the Etherum network [36] and are eventually stored in blocks in the block chain. FIG. 3 shows each block [52] contains a signed hash [54] of the contents of the preceding block, making it impossible for a block's contents to be tampered with. It is possible to traverse the entire block chain [16] to ensure that the hash [54] of one block [52] is stored in the block [52] that follows it.

This invention is directed to a cost effective bank transaction approval or decline system and methods, where access is negotiated via smart contract-2 and granted via issuing a token [50] for a bank or other establishment or vendor [42] to consume the requested data instance in order to approve or decline the waiting requested bank transaction. The same system and method is for approval for reading a DApp instance on the blockchain of photos, using the same system and method for approval for reading ECG's.

Representives Examples

The present application has particular application where the wherein the blockchain [16] is implemented as a smart contract forming an account holding object.

I) Research Application: In a research application the blockchain [16] is implemented as a smart contract forming an account holding object, namely a design history file for the research application. The blockchain will record which researchers performed what operations and/or testing and at what time. Photographs and other recordings of results will be authenticated and associated with the individual who took them, and where and when they were obtained. The result is a fully authenticated design history file, but much more than that. From a patent perspective the resulting blockchain based design history file essentially eliminates questions of inventorship and derivation. Companies can conclusively establish that a former employee did not have contribution to a project (if accurate). Further regulatory approval (FDA, EPA, FAA, ETC) is also streamlined as the regulators will have access to the appropriate design history via the blockchain, with the blockchain also keeping track of which regulators worked on the regulatory approval as well as when and where they have done so. It is conceivable that the patenting process will also be implemented on the blockchain with most material stored off chain except for critical prosecution history notations. Grant funding and approval can also be implemented on the blockchain [16]. In short in this application the present invention yields a complete record of the research application on the blockchain [16] that will a comprehensive listing of who has acted on the matter (inventors, regulators, patent examiner, grant reviewers, etc.) what they have done, when they did so and where they have done so.

II) Legal Application: In a completely different field consider a FAMILY LAW example pulled from a difficult divorce that results in a complex child custody agreement for the minor children. The present invention can implement this complex custody agreement as a blockchain [16] implemented as a smart contract forming the executed custody agreement. The agreement/blockchain [16] is modified in accordance with court order in dynamic fashion (without further court/lawyer intervention—assuming the parties confirm and agree in the manner required by court. The present system allows the parties to verify their acceptance of modified terms via their smartphones [18] and the agreement/blockchain [16] is modified according to its terms and rules. Further, and more importantly, the blockchain [16] includes compliance verification therein in which geolocation is a critical component (e.g. times of child custody are adjusted by agreement of the parties and proof of presence during child custody is maintained (off-blockchain because of the size of such data). Baseless allegations of one party not being in compliance by not being present at a given location at a given time are easily dismissed, and deficiencies are also of record. The blockchain [16] may have rules governing automatically advising the court when compliance failures become grossly negligent resulting in child endangerment. The geolocation is believed to be a critical component of such a system as the presence or lack thereof of a parent during child custody issues is an often-litigated matter. [0079] III) Real Estate Application: The use of blockchain [12] for real estate transactions has been proposed with such systems making title searches obsolete. In April 2016, a local government and software firm Bitfury Group launched a project to register land titles via a private blockchain. The present system carries this further by allowing for user geolocation to be coupled to the record. Inspectors, contractors, mortgage lenders, and even tenants may have advantages in tying geolocation to a blockchain record and coupled with user identification.

While this invention has been particularly shown and described with references to the preferred embodiments thereof, it will be understood by those skilled in the art that various changes in form and details may be made therein without departing from the scope of the invention. The present invention is defined by the appended claims and equivalents thereto.

What is claimed is:

1. A blockchain network management method comprising the steps of:
   a) providing a blockchain network configured for providing individual blockchain users with access to a blockchain;
   b) providing individual blockchain users with a smartphone having a GPS receiving unit associated with a communications network and with a biometric user identification technology coupled to the smartphone;
   c) identifying an individual blockchain user with the biometric user identification technology by obtaining biometric characteristics that are unique to each human via the communications network;
   d) authenticating the individual blockchain user's identity and geolocation in an authentication network coupled to the communications network; and
   e) providing access of authenticated individual blockchain users to the individual blockchain.

2. The blockchain network management method according to claim 1, wherein providing access of authenticated individual blockchain users to the individual blockchain includes writing data to the blockchain, including data associated with each authenticated user.

3. The blockchain network management method according to claim 1, wherein providing access of authenticated individual blockchain users to the individual blockchain includes reading data from the blockchain.

4. The blockchain network management method according to claim 1, wherein providing access of authenticated individual blockchain users includes issuing access tokens to individual users.

5. The blockchain network management method according to claim 4, wherein the biometric user identification technology coupled to the smartphone is a passive biometric user identification technology.

6. The blockchain network management method according to claim 5, wherein the biometric user identification technology coupled to the smartphone is one of i) a continuous heart based biometric user identification technology, ii) fingerprint biometric user identification technology, or iii) facial recognition biometric user identification technology.

7. The blockchain network management method according to claim 6, wherein the blockchain is a smart contract forming an account holding object.

8. The blockchain network management method according to claim 7, wherein the blockchain network utilizes a decentralized application design using a storage and distributing file sharing platform.

9. The blockchain network management method according to claim 8, wherein select user information associated with the blockchain is stored off of the blockchain.

10. A blockchain network management system comprising:
  a) a blockchain network configured for providing individual blockchain users with access to a blockchain;
  b) a communication network for individual blockchain users with a smartphone having a GPS receiving unit;
  c) a biometric user identification technology coupled to the smartphone individual blockchain users, wherein the system is configured for identifying an individual blockchain user with the biometric user identification technology by obtaining biometric characteristics that are unique to each human via the communications network;
  d) an authentication network coupled to the communications network [20] for authenticating the individual blockchain user's identity and geolocation, wherein the system provides access of authenticated individual blockchain users to the individual blockchain.

11. The blockchain network management system according to claim 10, further including tokens issued to individual authenticated users for providing access to the individual blockchain.

12. The blockchain network management system according to claim 11, wherein the blockchain is a smart contract forming an account holding object.

13. The blockchain network management system according to claim 12, wherein the blockchain network includes a decentralized application design using a storage and distributing file sharing platform.

14. The blockchain network management system according to claim 13, wherein the biometric user identification technology coupled to the smartphone is one of i) a continuous heart based biometric user identification technology, ii) fingerprint biometric user identification technology, or iii) facial recognition biometric user identification technology.

15. The blockchain network management system according to claim 14, wherein access of authenticated individual blockchain users to the individual blockchain includes writing data to the blockchain, including data associated with each authenticated user, and reading data from the blockchain.

16. A blockchain network management method comprising the steps of:
  a) providing a blockchain network configured for providing individual blockchain users with access to a blockchain;
  b) providing individual blockchain users with a smartphone having a GPS receiving unit associated with a communications network and with a biometric user identification technology coupled to the smartphone;
  c) identifying an individual blockchain user with the biometric user identification technology by obtaining biometric characteristics that are unique to each human via the communications network, wherein the biometric user identification technology coupled to the smartphone is one of i) a continuous heart based biometric user identification technology, ii) fingerprint biometric user identification technology, or iii) facial recognition biometric user identification technology;
  d) authenticating the individual blockchain user's identity and geolocation in an authentication network coupled to the communications network; and
  e) providing access of authenticated individual blockchain users to the individual blockchain, wherein providing access of authenticated individual blockchain users to the individual blockchain includes writing data to the blockchain, including data associated with each authenticated user [14] and includes reading data from the blockchain.

17. The blockchain network management method according to claim 16, wherein the blockchain is a smart contract forming an account holding object, and further including tokens issued to individual authenticated users for providing access to the individual blockchain.

18. The blockchain network management method according to claim 17, wherein the blockchain network utilizes a decentralized application design [28] using a storage and distributing file sharing platform.

19. The blockchain network management method according to claim 18, wherein select user information associated with the blockchain is stored off of the blockchain.

* * * * *